United States Patent
Aronov et al.

(10) Patent No.: US 11,218,011 B2
(45) Date of Patent: Jan. 4, 2022

(54) FAST CHARGING AND POWER BOOSTING LITHIUM-ION BATTERIES

(71) Applicant: StoreDot Ltd., Herzeliya (IL)

(72) Inventors: Daniel Aronov, Netanya (IL); Avraham Edelshtein, Herzelia (IL); Amir Tirosh, Mishmeret (IL); Doron Myersdorf, Herzeliya (IL)

(73) Assignee: Storedot Ltd., Herzeliya (IL)

( * ) Notice: Subject to any disclaimer, the term of this patent is extended or adjusted under 35 U.S.C. 154(b) by 308 days.

(21) Appl. No.: 16/395,643

(22) Filed: Apr. 26, 2019

(65) Prior Publication Data

US 2020/0343735 A1 Oct. 29, 2020

(51) Int. Cl.
*H02J 7/00* (2006.01)
*H01M 4/38* (2006.01)
(Continued)

(52) U.S. Cl.
CPC ............. *H02J 7/007* (2013.01); *H01M 4/386* (2013.01); *H01M 4/387* (2013.01);
(Continued)

(58) Field of Classification Search
CPC ...... H02J 7/007; H02J 7/0072; H02J 7/00032; H02J 7/0071; H02J 7/005; H01M 4/386;
(Continued)

(56) References Cited

U.S. PATENT DOCUMENTS

| 5,583,417 A | * | 12/1996 | Yuen | H02J 7/007184 320/160 |
| 8,132,026 B2 | * | 3/2012 | Koyama | H02J 7/00 713/300 |

(Continued)

FOREIGN PATENT DOCUMENTS

WO    WO 2018/109774    6/2018

OTHER PUBLICATIONS

Weixiang Shen et al. "Charging Algorithms of Lithium-Ion Batteries: an Overview" 2012 7th IEEE Conference on Industrial Electronics and Applications (ICIEA), pp. 1567-1572.
(Continued)

*Primary Examiner* — Naum Levin
(74) *Attorney, Agent, or Firm* — Reches Patent

(57) ABSTRACT

Charging systems and methods are provided, which increase charging currents and reduce charging durations for battery cells with metalloid-based anodes that enable high C-rate (charging rate) charging. Specifically, methods comprise charging battery cells having metalloid-based anodes having Si, Ge and/or Sn-based anode active material, by providing a high-C charging current of at least 4 C (or 5 C, or 10 C or more) over a range of at least 10-70% SoC (state of charge) of the battery cells. Charging systems comprise a booster unit configured to provide a high-C charging current over at least most of the SoC range of battery cells having metalloid-based anodes in the at least one battery unit. Charging systems further comprise a user interface configured to receive user preferences concerning a specified charging duration and/or a specified target SoC—for implementation by the charging system.

11 Claims, 5 Drawing Sheets

(51) Int. Cl.
  *H01M 10/44* (2006.01)
  *H01M 4/02* (2006.01)
(52) U.S. Cl.
  CPC ......... *H01M 10/441* (2013.01); *H02J 7/0021* (2013.01); *H01M 2004/027* (2013.01)
(58) Field of Classification Search
  CPC .... H01M 4/387; H01M 10/441; H01M 10/44; H01M 2004/027; Y02E 60/10
  See application file for complete search history.

(56) References Cited

U.S. PATENT DOCUMENTS

| | | | |
|---|---|---|---|
| 8,975,866 B2* | 3/2015 | McGrath | B60L 53/54 320/109 |
| 9,213,069 B2* | 12/2015 | Joe | H01M 4/362 |
| 9,450,440 B2* | 9/2016 | Yebka | H02J 7/0047 |
| 9,548,492 B2* | 1/2017 | Affinito | H01M 4/667 |
| 9,614,258 B2* | 4/2017 | Takahashi | H01M 10/48 |
| 9,787,126 B2* | 10/2017 | Yamazaki | H02J 7/00711 |
| 9,935,305 B2* | 4/2018 | Makino | H01M 4/70 |
| 10,044,072 B2* | 8/2018 | Kamizori | H01M 10/425 |
| 10,122,042 B2* | 11/2018 | Krasovitsky | H01M 10/04 |
| 10,199,677 B2 | 2/2019 | Drach et al. | |
| 10,293,704 B2* | 5/2019 | Aronov | H02J 7/0022 |
| 10,763,684 B2* | 9/2020 | Horiuchi | H02J 7/00718 |
| 2007/0166617 A1* | 7/2007 | Gozdz | H01M 4/136 429/231.95 |
| 2007/0279011 A1* | 12/2007 | Jones | H01G 9/14 320/167 |
| 2008/0238357 A1* | 10/2008 | Bourilkov | H02J 7/00038 320/106 |
| 2010/0225277 A1* | 9/2010 | Ochi | H02J 7/0016 320/132 |
| 2010/0289457 A1* | 11/2010 | Onnerud | H02J 7/00711 320/162 |
| 2012/0091966 A1* | 4/2012 | Mori | H01M 10/44 320/134 |
| 2013/0207618 A1* | 8/2013 | Renken | H01M 10/425 320/155 |
| 2015/0270544 A1* | 9/2015 | Yoshida | H01M 4/5825 429/209 |
| 2016/0099593 A1* | 4/2016 | Lim | H02J 7/0068 320/114 |
| 2017/0294687 A1 | 10/2017 | Burshtain et al. | |
| 2018/0152039 A1* | 5/2018 | Horiuchi | H02J 7/00718 |
| 2018/0198161 A1* | 7/2018 | Krasovitsky | H01M 4/04 |
| 2018/0266637 A1* | 9/2018 | Curlett | H01M 10/425 |
| 2018/0301749 A1* | 10/2018 | Krasovitsky | H01M 10/04 |
| 2018/0312072 A1* | 11/2018 | Yang | B60L 11/1842 |
| 2019/0148774 A1 | 5/2019 | Kuks et al. | |
| 2019/0170827 A1* | 6/2019 | Shoa Hassani Lashidani | H02J 7/0068 |
| 2019/0319321 A1* | 10/2019 | Wang | H02J 7/04 |
| 2020/0039376 A1* | 2/2020 | Miyaki | G01R 31/36 |
| 2020/0076223 A1* | 3/2020 | Kuriki | H02J 7/0021 |
| 2020/0287248 A1* | 9/2020 | Aronov | H02J 7/005 |

OTHER PUBLICATIONS

P.H.L. Notten et al. "Boostcharging Li-ion batteries: A challenging new charging concept" Journal of Power Sources 145 (2005) pp. 89-94.

\* cited by examiner

FAST CHARGING AND POWER BOOSTING LITHIUM-ION BATTERIES

BACKGROUND OF THE INVENTION

1. Technical Field

The present invention relates to the field of energy storage devices, and more particularly, to boosting the charging profiles of lithium ion batteries.

2. Discussion of Related Art

Lithium ion batteries are used for a growing range of applications, as their safety and performance are improved. An important parameter in operation of lithium ion batteries is their charging rates, that are continuously raised to supply the increasing demand for fast-charged lithium ion batteries. Shen et al. 2011 ("Charging algorithms of lithium-ion batteries: an overview", Proceedings of the 2012 7th IEEE Conference on Industrial Electronics and Applications, ICIEA 2012. 1567-1572. 10.1109/ICIEA.2012.6360973.) provides an overview of charging procedures and Notten et al. 2005 ("Boostcharging Li-ion batteries: A challenging new charging concept. Journal of Power Sources. 145. 89-94. 10.1016/j.jpowsour.2004.12.038) teaches charging boosting ideas, both incorporated herein by reference in their entirety.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a method comprising charging battery cells having metalloid-based anodes having Si, Ge and/or Sn-based anode active material, by providing a high-C charging current of at least 4 C (or 5 C, or 10 C or more) over a range of at least 10-70% SoC (state of charge) of the battery cells. In embodiments, the method may include providing one or more batteries having metalloid-based anodes having a Si, Ge, and/or Sn-based anode active material for charging.

One aspect of the present invention provides a charging system comprising a main charging unit configured to charge at least one battery unit according to a specified charging plan comprising an initial high-C charging phase within at least a part of 10%-30% SoC of the battery unit and a consecutive charging period at a charging rate that is lower than 5 C, and a booster unit configured to provide a high-C charging current over at least most of the SoC range of battery cells having metalloid-based anodes in the at least one battery unit. In embodiments, the system may comprise at least one battery cell having a metalloid-based anode having a Si, Ge and/or Sn-based anode active material.

One aspect of the present invention provides a charging system comprising a main charging unit configured to charge battery cells having metalloid-based anodes having Si, Ge and/or Sn-based anode active material, by providing a high-C charging current of at least 4 C (or 5 C, or 10 C or more) over a range of at least 10-70% SoC (state of charge) of the battery cells, a user interface configured to receive user preferences concerning a specified charging duration and/or a specified target SoC, and a booster unit configured to boost the charging current above the high-C charging current, according to the user preferences.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1A:
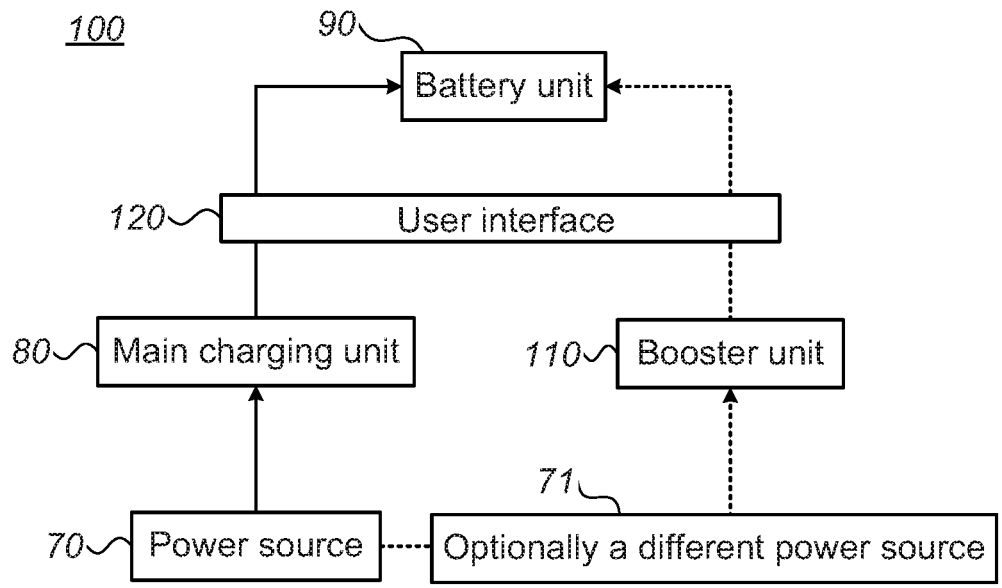
FIG. 1A is a high-level schematic block diagram of charging systems, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing", "deriving" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention provide efficient and economical methods and mechanisms for charging batteries and thereby provide improvements to the technological field of energy storage. Charging systems and methods are provided, which increase charging currents and reduce charging durations for battery cells with metalloid-based anodes that enable high C-rate (charging rate) charging. Specifically, methods comprise charging battery cells having metalloid-based anodes having Si, Ge and/or Sn-based anode active material, by providing a high-C charging current of at least 4 C (or 5 C, or 10 C or more) over a range of at least 10-70% SoC (state of charge) of the battery cells. Charging systems comprise a booster unit configured to provide a high-C charging current over at least most of the SoC range of battery cells having metalloid-based anodes in the at least one battery unit. Charging systems further comprise a user interface configured to receive user preferences concerning a specified charging duration and/or a specified target SoC—for implementation by the charging system. Power boosts may include higher C-rates at least over short periods, extended high-C charging profiles (e.g., extended constant current charging phases) and/or extended constant voltage charging periods, defined according to user preferences and battery data.

FIG. 1A is a high-level schematic block diagram of a charging system 100, according to some embodiments of the invention. Charging system 100 may comprise a main charging unit 80 configured to charge at least one battery unit 90 according to specified charging parameters; a user interface 120 configured to receive user preferences concerning the charging process, in particular required charging enhancements such as shorter charging duration than provided by main charging unit 80, higher charging level than provided by main charging unit 80, or other specific parameters; and a booster unit 110 configured to provide the required charging enhancements as defined or selected by the user via user interface 120.

Both main charging unit 80 and booster unit 110 may receive power from a common power source 70, which may comprise any one or more available power sources, and/or booster unit 110 may receive all or some of the power it provides from a different power source 71. In various embodiments, power sources 70 and 71 may comprise any electrical power supply (e.g., electric grid, a power adapter, solar energy or other power supplier) and/or any energy storage device (e.g., battery, supercapacitor, or other technologies). For example, power source 70 providing energy to main charging unit 80 may comprise the electric grid, while power source 71 providing energy to booster unit 110 may comprise an energy storage such as a stack of batteries or other energy storage devices—that may be used as enhancement of the power that is available from power source 70 (e.g., the grid) through main charging unit 80. In certain embodiments, additional power source 71, such as energy storage devices, may be charged from power source 70 (e.g., the electric grid) at periods it is not fully used by main charging unit 80, to increase the stored energy therein. In certain embodiments, power source 70 and/or additional power source 71 may comprise alternative energy sources such as sun, wind or geothermal energy sources, that may be used, e.g., for providing energy to main charging unit 80, with booster unit 110 enhancing energy delivery upon requirement from an different source (e.g., the grid as additional power source 71), or the alternative energy sources may be used to provide at least part of additional power source 71 that provides energy to booster unit 110 as a possible enhancement to power source 70 (e.g., the electric grid) that may be used to provide a baseline level of energy via main charging unit 80.

In certain embodiments, charging system 100 comprises main charging unit 80 configured to charge battery cells 90 having metalloid-based anodes having Si, Ge and/or Sn-based anode active material, by providing a high-C charging current of at least 4 C (or 5 C, or 10 C or more) over a range of at least 10-70% SoC (state of charge) of battery cells 90. User interface 120 may be configured to receive user preferences concerning a specified charging duration and/or a specified target SoC, and booster unit 110 may be configured to boost the charging current above the high-C charging current, according to the user preferences.

For example, booster unit 110 may be configured to provide the boost with a SoC range that is located between 10% and 70% and spans 10% to 40% of SoC. In various embodiments, main charging unit 80 may be configured to charge battery cells 90 with a gradually increasing current under 10% SoC and/or with a constant voltage above 70% SoC.

In certain embodiments, charging system 100 comprises main charging unit 80 configured to charge at least one battery unit 90 according to a specified charging plan comprising an initial high-C charging phase within at least a part of the range of 10%-30% SoC of battery unit(s) 90 and a consecutive charging period at a charging rate that is lower than 5 C. Booster unit 110 may be configured to provide a high-C charging current over at least most of the SoC range of battery cells having metalloid-based anodes in battery unit(s) 90.

For example, the high-C charging current may comprise a charging current of at least 4 C (or 5 C, or 10 C or more), the at least most of the SoC range comprises at least 10-70% SoC of battery cells 90, and the metalloid-based anodes may comprise anodes having Si, Ge and/or Sn-based anode active material (see below). User interface 120 may be configured to allow a user to define a duration of the high-C charging current by booster unit 110. Booster unit 110 may further be configured to deliver additional energy to battery unit 90 during a specified period and within a boost SoC range that is smaller than 50%. For example, the boost SoC range is located between 10% and 70% SoC and spans 10% to 40% of SoC. In various embodiments, user interface 120 may be configured to allow a user to define the delivered additional energy according to time and SoC considerations.

In embodiments, user interface 110 may be further configured to allow a user to define the delivered additional energy and/or the time and SoC considerations with respect to one or more types of battery cell chemistries.

Battery unit(s) 90 may comprise some battery cells having metalloid-based anodes or all of battery unit(s) 90 may comprise battery cells having metalloid-based anodes, e.g., as disclosed in U.S. Patent Publication No. 2017/0294687, incorporated herein by reference in its entirety. For example, battery cells 90 may have anode active material that mainly comprises any of Si, Ge and/or Sn (e.g., >80% metalloids), in contrast to prior art cells that may have anode active material that mainly comprises graphite (e.g., >80% graphite) and may be decorated with metalloids (e.g., at <20 wt %). Disclosed lithium ion batteries 90 (and/or respective battery cells thereof) may at least partly be configured, e.g., by selection of materials, to enable operation at high charging and/or discharging rates (C-rate), ranging from 3-10 C-rate, 10-100 C-rate or even above 100 C, e.g., 4 C, 5 C, 10 C, 15 C, 30 C or more. It is noted that the term C-rate is a measure of charging and/or discharging of cell/battery capacity, e.g., with 1 C denoting charging and/or discharging the cell in an hour, and XC (e.g., 4 C, 5 C, 10 C, 50 C etc.) denoting charging and/or discharging the cell in 1/X of an hour—with respect to a given capacity of the cell.

Figure 1B:
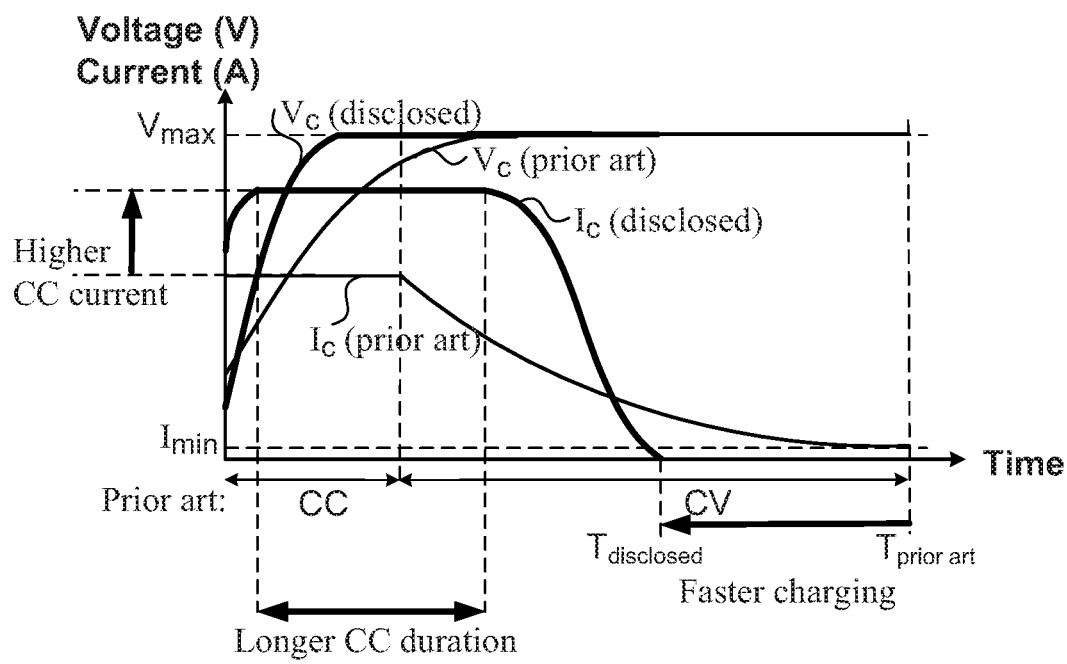
FIG. 1B is a high-level schematic illustration of disclosed charging curves according to some embodiments of the invention, compared with prior art charging curves.

FIG. 1B is a high-level schematic illustration of disclosed charging curves according to some embodiments of the invention, compared with prior art charging curves. Prior art charging curves for lithium ion batteries having graphite-based anode material (denoted as Ic(prior art) for the charging current and Vc(prior art) for the charging voltage) typically follow a CC-CV sequence with a relatively short CC stage, e.g., at low SoCs, e.g., up to 30% SoC and taking only 20-30% of the charging time, as described, e.g., in Shen et al. 2011. In contrast, disclosed charging algorithms (denoted as Ic(disclosed) for the charging current and Vc(disclosed) for the charging voltage), applied to lithium ion batteries having metalloid-based anode material, provide higher CC charging current, longer CC charging duration (e.g., at low, medium and possibly high SoCs, e.g., up to 90% SoC and taking over 30% of the charging time, possibly up to 90-100% of the overall charging time), as indicated schematically in FIG. 1B. As a result, disclosed charging algorithm, provide significantly shorter charging durations, indicated schematically in FIG. 1B as $T_{disclosed}$ vs. $T_{prior\ art}$.

In various embodiments, charging system 100 may be modified to offer users to boost the charging process in various ways, using booster unit 110, as disclosed herein. For example, charging system 100 may comprise user interface 120 (e.g., a graphical user interface GUI) configured to allow a user to define a duration of the high-C charging current by booster unit 110.

Figure 2A:
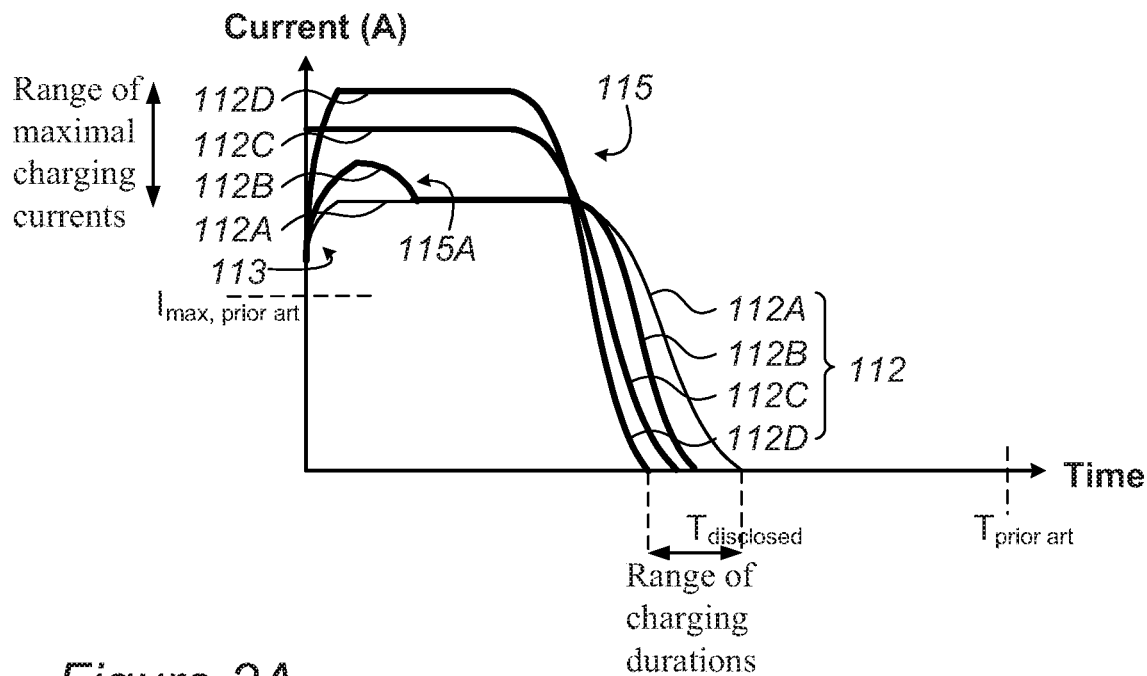
FIG. 2A is a high-level schematic illustration of a range of charging curves provided by charging systems, according to some embodiments of the invention.

FIG. 2A is a high-level schematic illustration of a range of charging curves 112 provided by charging system 100, according to some embodiments of the invention. In various embodiments, charging system 100 may be configured to provide baseline fast charging 112A (as described, e.g., in FIG. 1B, being faster and having a higher charging current than prior art charging), e.g., by main charging unit 80, and optional boosted charging curves 112B, 112C, 112D (as non-limiting examples) that may include additional energy 115 (shown schematically) provided by booster unit 110 according to user requirements received via user interface 120. For example, booster unit 110 may be configured to provide a range of maximal charging currents with a corresponding range of charging durations, represented schematically by boosted charging curves 112C, 112D.

Figure 3A:
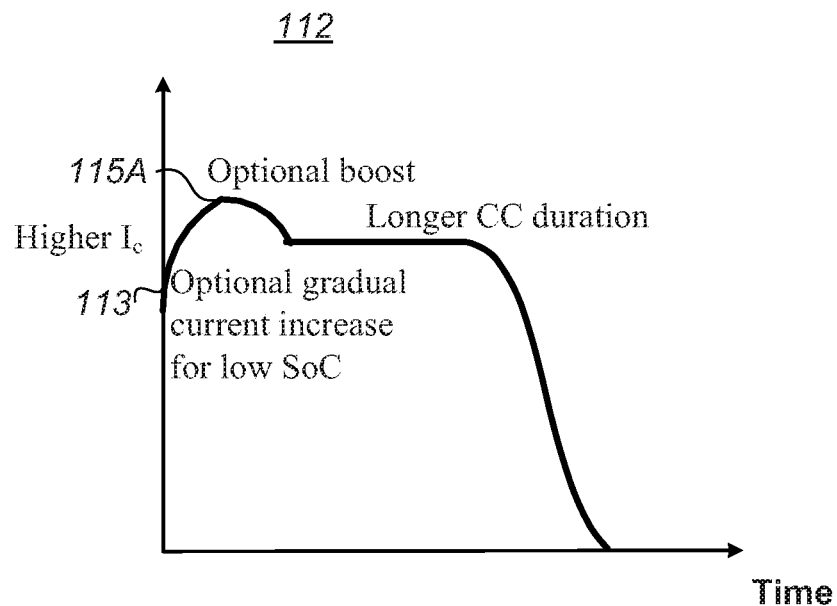
FIG. 3A is a high-level schematic illustration of multiple features of disclosed charging algorithms and charging curves, according to some embodiments of the invention.

Alternatively or complementarily, booster unit 110 may be configured to provide additional energy 115 in a temporary boost 115A of higher current above the CC charging current, as illustrated schematically in charging curve 112B (see also FIG. 3A). It is noted that boost 115A of additional energy 115 illustrated schematically in charging curve 112B is different than prior art boosts taught, e.g., by Notten et al. 2005, as the latter are provided exclusively during a short initial period with the battery being at a very low (e.g., 0-10% SoC) state of charge. In contrast, disclosed boosts 115A are provided following an initial lower charging current as low SoCs, and/or at any charging state of battery 90. For example, boost 115A may be provided for batteries 90 at higher states of charge, e.g., 30%, 50%, 70% or any other value, according to the SoC of battery 90 as user engages with system 100. In various embodiments, boosts 115A may be configured to deliver additional energy to battery unit(s) 90 during a specified period and within a boost SoC range that is smaller than 50%. For example, high charging currents, e.g., providing charging rate higher than 4 C, e.g., 5 C, 10 C, 20 C, 30 C, 50 C, etc., may be provided over a narrow SoC range, e.g., for short charging periods, e.g., according to user preferences, enhancing the level of voltage achieved in the short charging period. In certain embodiments, the boost SoC range may be located between 10% and 70% and span 10% to 40% of SoC, e.g., be between any of 10-30% SoC, 20-50% SoC, 30-40% SoC, 60-90% SoC, etc. User interface 120 may be configured to allow the user to define delivered additional energy 115A according to time and SoC considerations. In certain embodiments, booster unit 110 may be further configured to extend a boosting period into an extended constant voltage charging period, that may be pre-defined and/or correspond to user preferences. It is noted that energy boost may be delivered at high SoCs (e.g., 70%, 80%, 90% or comparable values) by booster unit 110, at least for short periods, in contrast to the prior art that teaches only short-term boosts and only boosts at low SoC values. Advantageously, providing boosts at high SoC values (e.g., above any of 30%, 50%, 70%, 90% or intermediate values) provides a much more flexible system 100 that allows users to fully utilize the charging capabilities of batteries 90.

In various embodiments, the power boost may be supplied in a range of profiles (e.g., 112A-112F), adjusted or tuned with respect to components of battery 90, for example, in case of hybrid batteries 90, cells with metalloid-based anode active material may be charged using any of the disclosed charging profiles while cells with graphite-based anode active material may be charged using prior art charging profiles. Specific charging profiles may be adapted to the battery condition and state of charge, and to user preferences. In various embodiments, boosted profiles may therefore provide quicker charging alongside increased safety and improved SoH (stage of health) of the cells. It is noted that power boosting may also be applied to carbon (e.g., graphite)-based anode material, e.g., boosting charging utilizing added metalloids (up to 20%, e.g., of silicon may be added to the graphite), and/or within the respective battery's operational parameters.

It is noted that a lower current, denoted schematically by numeral 113, may be applied at the commencement of charging of batteries 90 being at a very low SoC, e.g., 0-5%, 0-10% or similar values, due to higher low-SoC resistance of batteries 90. Clearly, charging of batteries 90 that starts at higher SoCs, e.g., 5%, 10% or higher (e.g., 30%, 50%, 70% etc.) does not require initial lower current stage 113. For example, charging curve 112C illustrates schematically a case with charging starting at some SoC higher than the minimal SoC for full fast charging (which may be e.g., 5% SoC, 10% SoC or other small value)—starting namely with full high-C charging current from the beginning of the charging. It is further noted that initial lower current stage 113 may still be higher than prior art maximal charging current, due to the different chemistries (the internal resistance of cells with metalloid-based anodes is generally lower than the internal resistance of cells with graphite-based anode) and operation of metalloid-based and graphite-based anodes.

In certain embodiments, in which the charging process may be limited by the performance of main charging unit 80 (e.g., when batteries 90 are technically able to receive more power than main charging unit 80 is able to provide), booster unit 110 may be configured to provide some or all of the excessive power that is applicable to batteries 90 above the performance of main charging unit 80. For example, batteries 90 with metalloid-based anodes may receive from system 100 more power than main charging unit 80, designed to charge only batteries with graphite-based anodes, can provide—by utilizing additional power provided by booster unit 110. In certain embodiments, user interface 120 may be configured to identify the type of battery chemistry (and optionally the distribution of chemistry types in batteries 90 comprising cells with multiple types of chemistry) and to adjust the charging profile accordingly, utilizing both main charging unit 80 and booster unit 110 with respect to the respective battery chemistry.

Figure 2B:
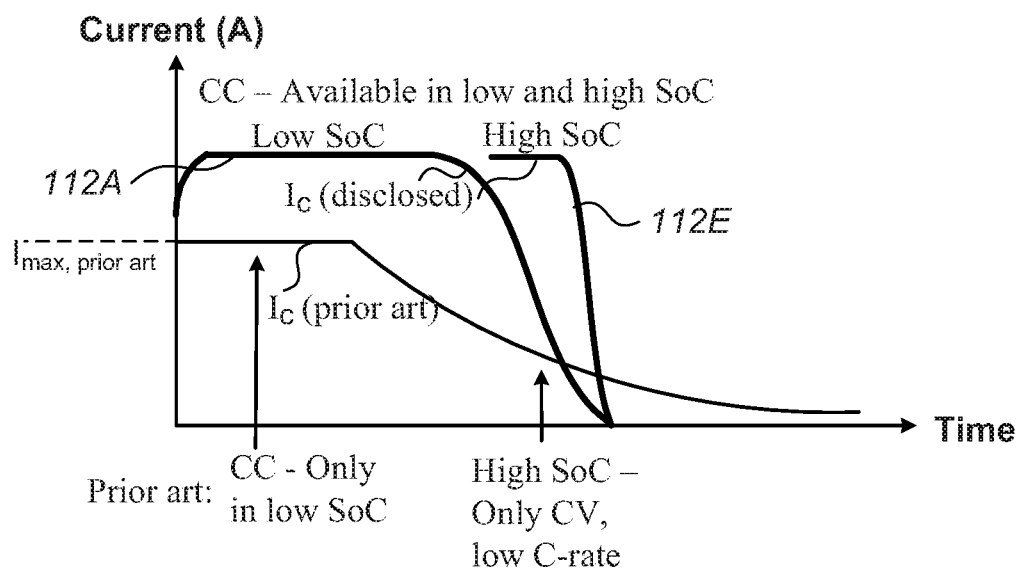
FIG. 2B is a high-level schematic illustration of additional differences between disclosed charging algorithms, according to some embodiments of the invention, and prior art charging.

FIG. 2B is a high-level schematic illustration of additional differences between disclosed charging algorithms, according to some embodiments of the invention, and prior art charging. Prior art clearly defines high C rate CC charging during low SoCs only, meaning that batteries 90 which are partly discharged (e.g., having SoC of 50% or higher) cannot be charged at high-C rates in the prior art, and are rather charged at CV, with lower currents and longer time. In contrast, disclosed systems 100 are configured to enable high-C charging (e.g., in CC mode and/or in a boosted mode) at a much broader range of SoCs, e.g., anywhere between 10-90% SoC, or possibly between 5-95% SoC or equivalent ranges. For example, charging curve 112E illustrated schematically in FIG. 2B, provides high-C charging at high SoC of battery 90.

FIG. 3A is a high-level schematic illustration of multiple features of disclosed charging algorithms and charging curves 112, according to some embodiments of the invention. As illustrated schematically, charging algorithms comprise higher charging currents, either as CC high-C currents and/or as temporary boost currents (see, e.g., temporary boost 115A in FIG. 2A) that may be determined according to user preferences, as well as longer high-C charging duration with respect to prior art, leading to much shortened periods of charging.

Figure 3B:
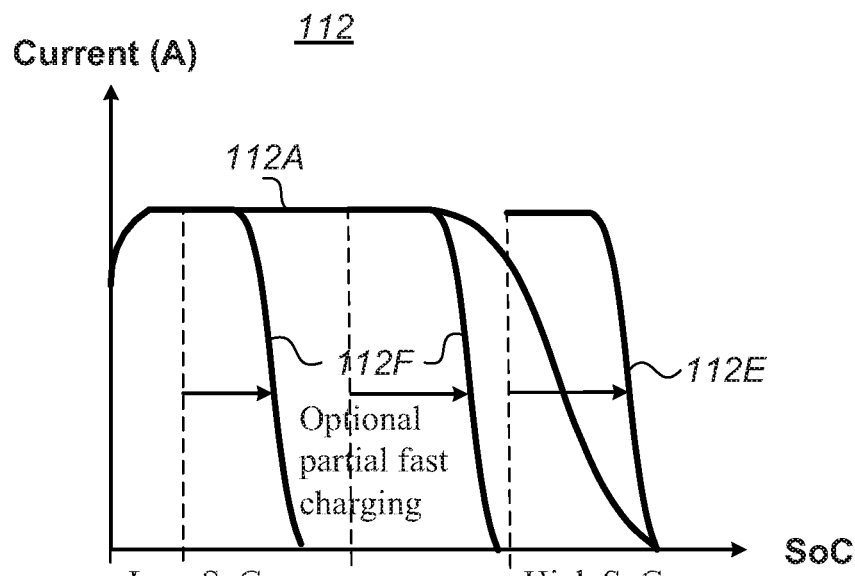
FIG. 3B is a high-level schematic illustration of a range of charging curves provided by charging systems, according to some embodiments of the invention.

FIG. 3B is a high-level schematic illustration of a range of charging curves 112 provided by charging system 100, according to some embodiments of the invention. Compared with baseline fast charging 112A, disclosed charging systems 100 enable provision of partial fast charging options 112F, e.g., for cases users prefer short partial charging due to time limitations. User interface 120 may be configured to adjust charging profile 112F (see e.g., FIG. 2A) according to specific time and SoC preferences of users, and use main charging unit 80 and/or booster unit 110 to provide appropriate short and/or partial charging profile 112F. In certain embodiments, charging system 100 may be configured to provide fast (high-C) charging 112E even when battery 90 is relatively full, e.g., over 70%, 80% and/or 90% SoC.

Figure 4:
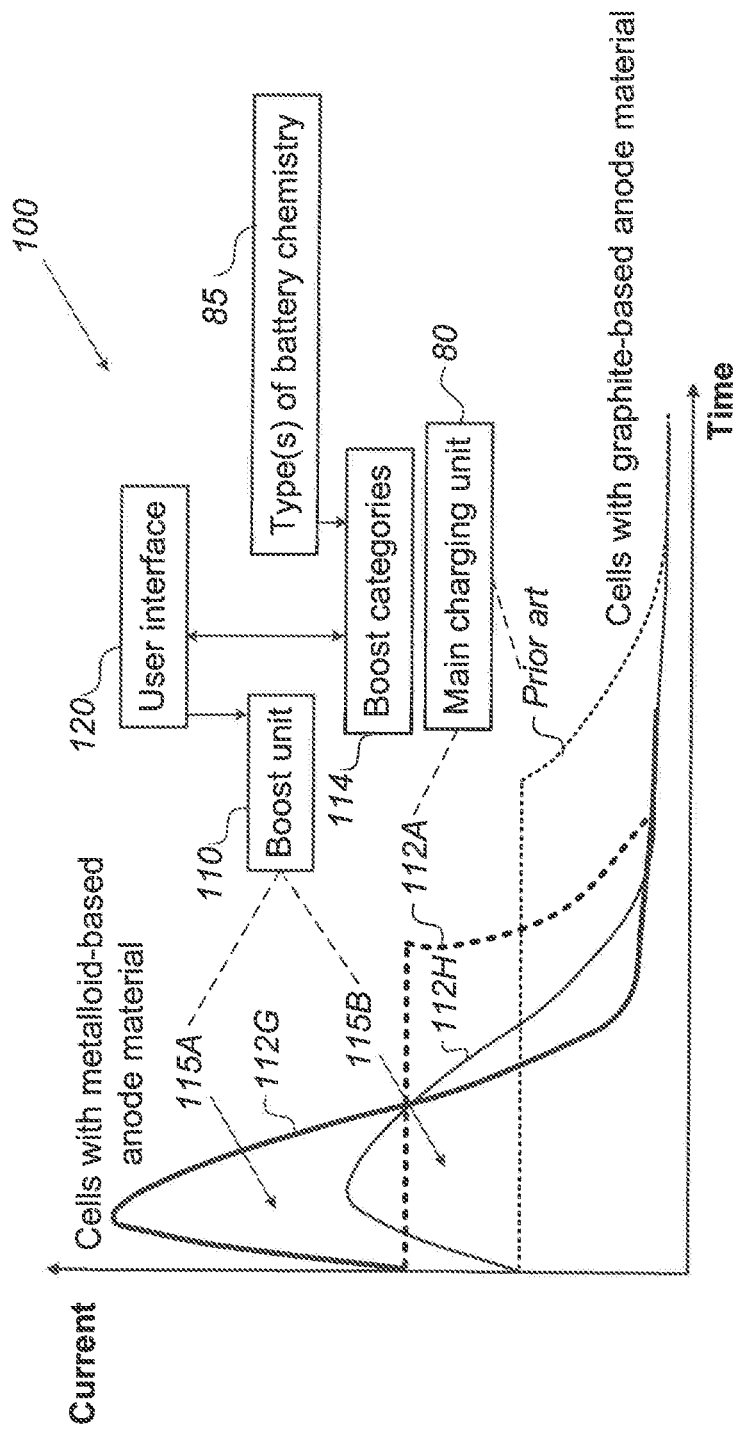
FIG. 4 is a high-level schematic illustration of boosting the charging above the high-C CC charging, in relation to the battery chemistries, according to some embodiments of the invention.

FIG. 4 is a high-level schematic illustration of boosting the charging above the high-C CC charging, in relation to the battery chemistries, according to some embodiments of the invention. In various embodiments, user interface 120 may be configured to allow the user to define delivered additional energy 115 in relation to specific battery chemistry(ies) 85, as provided by the user and/or as identified by charging system 100. Corresponding boost categories 114 may be defined with respect to each type of battery chemistry 85, and user interface 120 may be configured to let the user select specific boost charging curves 112 and/or levels of additional energy 115 with respect to available boost categories 114. In certain embodiments, user interface 120 may be configured to derive battery characteristics of the load (e.g., EV) via communication between the charging and the load, which may also be used to control the charged device profile, e.g., according to specified protocol(s) that relate the boost charging energy to the identified cells chemistry. Type of battery chemistry 85 may be used to define a charging operation window, from which the user may be allowed to define additional energy 115 according to time and SoC considerations.

FIG. 4 illustrates schematically boosting charging with respect to two types of battery chemistry 85, namely graphite-based and metalloid-based battery chemistries, which may be used in different loads and/or combined in a single load (e.g., EV having some graphite-based and some metalloid-based battery cells). For each type of battery chemistry 85, schematic charging curves are shown to schematically illustrate prior art CC/CV charging for graphite-based battery chemistry and baseline fast charging 112A for metalloid-based battery chemistry; and one example each for boosted charging 112G and 112H for metalloid-based battery chemistry and graphite-based battery chemistry, respectively, with corresponding additional energy delivery indications 115A for metalloid-based battery chemistry and 115B for graphite-based battery chemistry. It is noted that, in general, metalloid-based cells have higher charging rates than standard graphite cells. In graphite cells, the boost mode may be operative through the initial stage of boosted charging (see curve 112H) when the SoC is relatively low, to shorten the charging time. In contrast, metalloid-based cells have both faster charging in CC/CV mode (see curve 112A with respect to the prior art curve) and optional higher boost charging options (see curve 112G) with respect both to added energy 115A and to the extent of shortening of the charging time. Advantageously, metalloid-based cells enable boosting charging not only in low SoCs as in graphite-based cells, but also in medium and even high SoCs due to the cell chemistry characteristics. Correspondingly, user interface and boost unit 110 may offer and implement more optional charging boost varieties, differing, e.g., in the extent of additional energy 115 and charging time.

Elements from FIGS. 1A-4 may be combined in any operable combination, and the illustration of certain elements in certain figures and not in others merely serves an explanatory purpose and is non-limiting.

Figure 5:
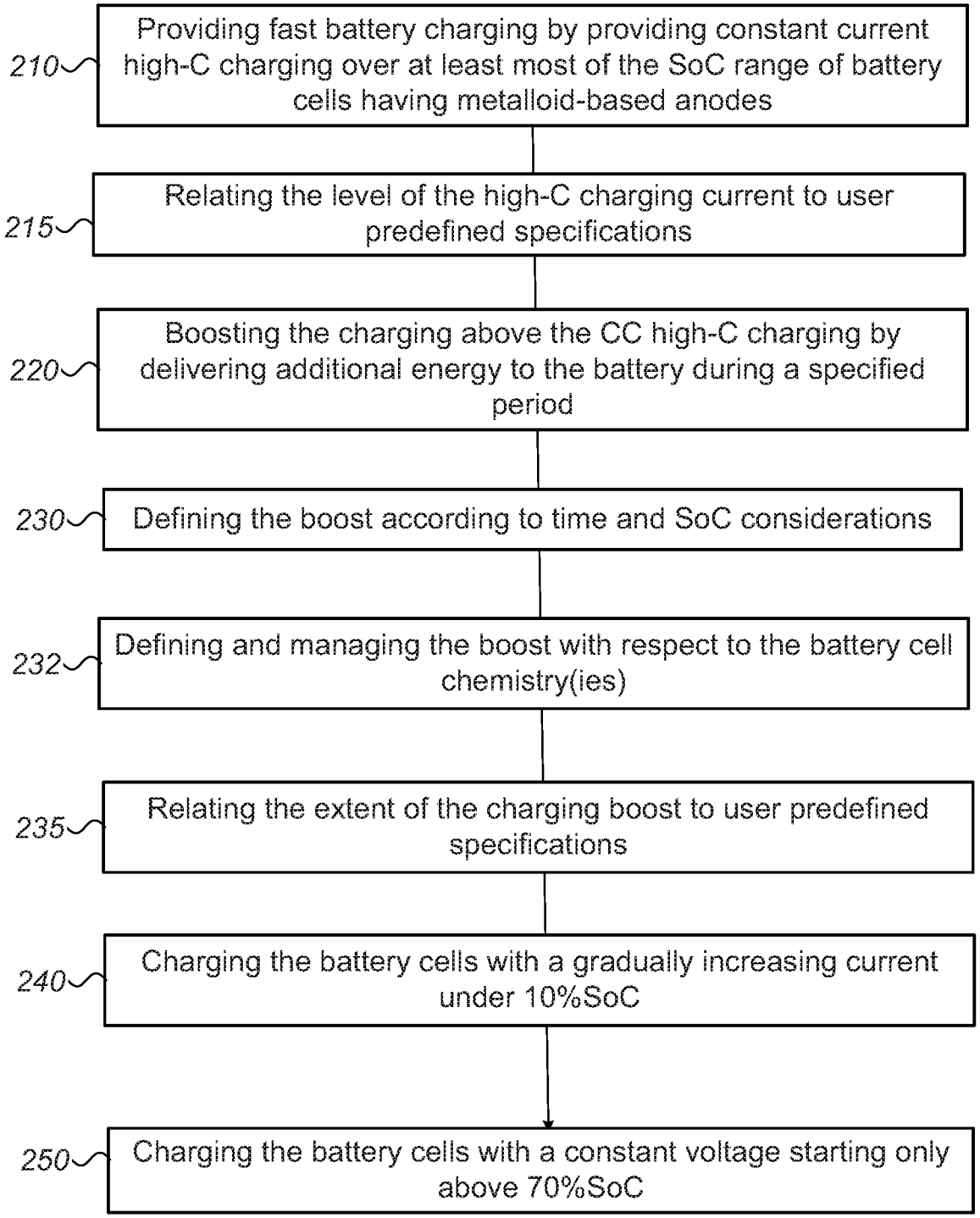
FIG. 5 is a high-level flowchart illustrating a method, according to some embodiments of the invention.

FIG. 5 is a high-level flowchart illustrating a method 200, according to some embodiments of the invention. The method stages may be carried out with respect to system 100 described above, which may optionally be configured to implement method 200. Method 200 may be at least partially implemented by at least one computer processor, e.g., in charging system 100. Certain embodiments comprise computer program products comprising a computer readable storage medium having computer readable program embodied therewith and configured to carry out the relevant stages of method 200. Method 200 may comprise the following stages, irrespective of their order.

Method 200 comprises providing fast battery charging by providing a high-C charging current over at least most of an SoC (state of charge) range of battery cells having metalloid-based anodes (stage 210). For example, the at least most of the SoC range may comprise any of at least 10-70% SoC, at least 10-90% SoC and/or at least 20-80% SoC of the battery cells. In certain embodiments, stage 210 may comprise charging battery cells having metalloid-based anodes having Si, Ge and/or Sn-based anode active material, by providing a high-C charging current of at least 4 C (or 5 C, or 10 C or more) over a range of at least 10-70% SoC (state of charge) of the battery cells. The high-C charging current may comprise a charging current of at least 4 C (or 5 C, or 10 C or more), possibly at least 20 C and/or 30 C. The metalloid-based anodes may comprise anodes having Si, Ge and/or Sn-based anode active material, as disclosed e.g., in U.S. Patent Publication No. 2017/0294687, incorporated herein by reference in its entirety. In certain embodiments, the high-C charging current may be provided over a range of up to 30% SoC (state of charge) of the battery cells In certain embodiments, method 200 may comprise relating a level of the high-C charging current to user predefined specifications such as a specified charging duration and/or a specified target SoC (stage 215).

Method 200 may further comprise boosting the fast battery charging above the high-C charging current by delivering additional energy to the battery cells during a specified period (stage 220). For example, the additional energy may be delivered over a boost SoC range that is smaller than 50%, for example over 10%, 20% or 30% boost SoC range, e.g., between 10-20% SoC, 10-30% SoC, 10-40% SoC, 20-60% SoC, etc. In certain embodiments, the boost SoC range may be located between 10% and 70% of SoC and span 10% to 40% of SoC, in embodiments according to the user's requirements or definitions.

In certain embodiments, method 200 further comprises defining the delivered additional energy according to time and/or SoC considerations (stage 230). Possibly, method 200 may further comprise defining and managing the boost with respect to the battery cell chemistry(ies) (stage 232), e.g., offering different boost options for metalloid-based cells and graphite-based cells. In certain embodiments, method 200 further comprises relating an extent of the boost to user predefined specifications (stage 235), e.g., according to specified levels of charging, specified charging durations, specified steps in step-wise charging, etc.

In certain embodiments, method 200 further comprises charging the battery cells with a gradually increasing current under 10% of SoC (stage 240), e.g., with respect to initial higher resistance at very low SoC. In certain embodiments, method 200 comprises charging the battery cells with a constant voltage starting only above 70% SoC (stage 250).

Any of the disclosed embodiments may be implemented in lithium ion batteries to improve their cycle life, charging/discharging rates, safety and/or capacity. Lithium ion batteries typically comprise anodes and cathodes with current collectors affixed thereto, packed with electrolyte and separator(s) in a soft or/and hard package (e.g., pouches, prismatic or cylindrical packages, etc. Anodes are typically made of anode material particles and additional materials, such as conductive additive(s), binder(s), surfactants, dispersive materials, porosity control materials, etc., and may comprise any of the anode configurations taught, e.g., by U.S. Patent Publication No. 2017/0294687, incorporated herein by reference in its entirety. For example, anodes may be based on carbon (e.g., graphite, graphene or other carbon-based materials), metalloid anode material such as Si, Ge, Sn and their combinations and/or metals such as Li-metal. Cathodes may comprise lithium metal oxide (LiMeO), wherein Me can be one or several metals selected from Ni, Co, Mn and Al or sulfur-based cathodes. For example, cathodes may comprise materials based on layered, spinel and/or olivine frameworks, such as LCO formulations (based on $LiCoO_2$), NMC formulations (based on lithium nickel-manganese-cobalt), NCA formulations (based on lithium nickel cobalt aluminum oxides), LMO formulations (based on $LiMn_2O_4$), LMN formulations (based on lithium manganese-nickel oxides) lithium iron-phosphorus oxide (LFP) formulations (based on $LiFePO_4$), lithium rich cathodes, and/or combinations thereof. Separator(s) may comprise various materials, e.g., polymers such as any of polyethylene (PE), polypropylene (PP), polyethylene terephthalate (PET), poly vinylidene fluoride (PVDF), polymer membranes such as a polyolefin, polypropylene, or polyethylene membranes. Multi-membranes made of these materials, micro-porous films and/or spray coating thereof, woven or non-woven fabrics etc. may be used as separator(s), as well as possibly composite materials including, e.g., alumina, zirconia, titania, magnesia, silica and calcium carbonate along with various polymer components as listed above.

In any of the disclosed embodiments, electrolytes may be based on liquid electrolytes, typically linear and cyclic carbonates, such as ethylene carbonate, diethyl carbonate, propylene carbonate, VC (vinylene carbonate), FEC (fluoroethylene carbonate), EA (ethyl acetate), EMC (ethyl methyl carbonate), DMC (dimethyl carbonate) and combinations thereof. In various embodiments, the electrolytes may comprise any liquid, polymer, gel (e.g., inorganic silica gel electrolytes), glass (e.g., amorphous sulfides-based electrolytes), solid polymer electrolytes (e.g., polyethylene oxide, fluorine-containing polymers and copolymers such as polytetrafluoroethylene), polycrystalline inorganic solid electrolytes and/or combinations thereof. Electrolytes may comprise lithium electrolyte salt(s) such as $LiPF_6$, $LiBF_4$, lithium bis(oxalato)borate, $LiN(CF_3SO_2)_2$, $LiN(C_2F_5SO_2)_2$, $LiAsF_6$, $LiC(CF_3SO_2)_3$, $LiClO_4$, LiTFSI, $LiB(C_2O_4)_2$, $LiBF_2(C_2O_4)$), tris(trimethylsilyl)phosphite (TMSP), and combinations thereof. Ionic liquid(s) may be added to the electrolyte as taught by WIPO Publication No. WO 2018/109774, incorporated herein by reference in its entirety. For example, electrolytes may comprise a large proportion, e.g., 10%, 20%, 30% or more of VC and/or FEC as prominent cyclic carbonate compound, as disclosed e.g., in U.S. Pat. No. 10,199,677, incorporated herein by reference in its entirety. In certain embodiments, electrolytes may comprise linear solvent comprising at least one three-carbon and/or four-carbon chain ester, cyclic carbonate solvent and at least one lithium salt, as disclosed e.g., in U.S. patent application Ser. No. 16/243,190, incorporated herein by reference in its entirety.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram or portions thereof.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A charging system comprising:
    a main charging unit configured to charge battery cells having metalloid-based anodes having Si, Ge and/or Sn-based anode active material, by providing a high-C charging current of at least 4 C over a range of at least 10-70% SoC (state of charge) of the battery cells,
    a user interface configured to receive user preferences concerning a specified charging duration and/or a specified target SoC, and
    a booster unit configured to boost the charging current above the high-C charging current, according to the user preferences.

2. The charging system of claim 1, wherein the booster unit is configured to provide a boost with a SoC range that is located between 10% and 70% SoC and spans 10% to 40% of SoC.

3. The charging system of claim 1, wherein the main charging unit is configured to charge the battery cells with a gradually increasing current under 10% SoC.

4. The charging system of claim 1, wherein the main charging unit is configured to charge the battery cells with a constant voltage above 70% SoC.

5. A charging system comprising:
    a main charging unit configured to charge at least one battery unit according to a specified charging plan comprising an initial high-C charging phase within at least a part of 10%-30% SoC of the battery unit and a consecutive charging period at a charging rate that is lower than 5 C, and
    a booster unit configured to provide a high-C charging current over at least most of the SoC range of battery cells having metalloid-based anodes in the at least one battery unit.

6. The charging system of claim 5, wherein the high-C charging current comprises a charging current of at least 4 C, the at least most of the SoC range comprises at least 10-70% SoC of the battery cells, and the metalloid-based anodes comprise anodes having Si, Ge and/or Sn-based anode active material.

7. The charging system of claim 5, further comprising a user interface configured to allow a user to define a duration of the high-C charging current by the booster unit.

8. The charging system of claim 5, wherein the booster unit is further configured to deliver additional energy to the battery unit during a specified period and within a boost SoC range that is smaller than 50% of SoC.

9. The charging system of claim 8, wherein the boost SoC range is located between 10% and 70% of SoC and spans 10% to 40% of SoC.

10. The charging system of claim 8, further comprising a user interface configured to allow a user to define the delivered additional energy according to time and SoC considerations.

11. The charging system of claim 10, wherein the user interface is further configured to allow a user to define the delivered additional energy and/or the time and SoC considerations with respect to one or more types of battery cell chemistries.

* * * * *